(12) United States Patent
Kodani et al.

(10) Patent No.: US 7,684,928 B2
(45) Date of Patent: Mar. 23, 2010

(54) NAVIGATION APPARATUS AND SERVER APPARATUS

(75) Inventors: Kiyoshi Kodani, Tottori (JP); Susumu Iida, Tottori (JP); Koji Sawada, Tottori (JP)

(73) Assignees: Sanyo Electric Co., Ltd., Osaka (JP); Tottori Sanyo Electric Co., Ltd., Tottri (JP)

( * ) Notice: Subject to any disclaimer, the term of this patent is extended or adjusted under 35 U.S.C. 154(b) by 1453 days.

(21) Appl. No.: 10/522,617

(22) PCT Filed: Jun. 13, 2003

(86) PCT No.: PCT/JP03/07582

§ 371 (c)(1),
(2), (4) Date: Jan. 31, 2005

(87) PCT Pub. No.: WO2004/036146

PCT Pub. Date: Apr. 29, 2004

(65) Prior Publication Data

US 2006/0080029 A1    Apr. 13, 2006

(30) Foreign Application Priority Data

Sep. 24, 2002  (JP) .............................. 2002-277561
Sep. 30, 2002  (JP) .............................. 2002-285598
Sep. 30, 2002  (JP) .............................. 2002-285601

(51) Int. Cl.
*G01C 21/30* (2006.01)

(52) U.S. Cl. ................................. 701/209; 340/995.12

(58) Field of Classification Search ......... 701/200–213; 340/905, 988–995.11, 995.12–995.18
See application file for complete search history.

(56) References Cited

U.S. PATENT DOCUMENTS 6,107,944 A * 8/2000 Behr et al. ............. 340/995.12
6,759,970 B1 * 7/2004 Horita et al. ................ 340/905

FOREIGN PATENT DOCUMENTS

| JP | 9-90869 | 4/1997 |
|---|---|---|
| JP | 10-111650 | 4/1998 |
| JP | 2001-014297 A | 1/2001 |
| JP | 2001-142819 | 5/2001 |
| JP | 2001-250194 | 9/2001 |
| JP | 2002-026836 A | 1/2002 |
| JP | 2002-183184 A | 6/2002 |
| JP | 2003-28653 | 1/2003 |
| JP | 2003-42782 | 2/2003 |
| JP | 2003-75176 | 3/2003 |

* cited by examiner

*Primary Examiner*—Richard M. Camby
(74) *Attorney, Agent, or Firm*—Arent Fox LLP

(57) ABSTRACT

A navigation apparatus acquires geographic information from a server apparatus. When the navigation apparatus does not store any geographic information that provides a continuous route from the starting point to a destination point, it transmits data of the starting point and destination point to the server apparatus to acquire therefrom geographic information that provides a continuous route from the starting point to the destination point. This efficient acquisition of geographic information realizes reduction of communication time and communication costs.

25 Claims, 11 Drawing Sheets

F I G. 4
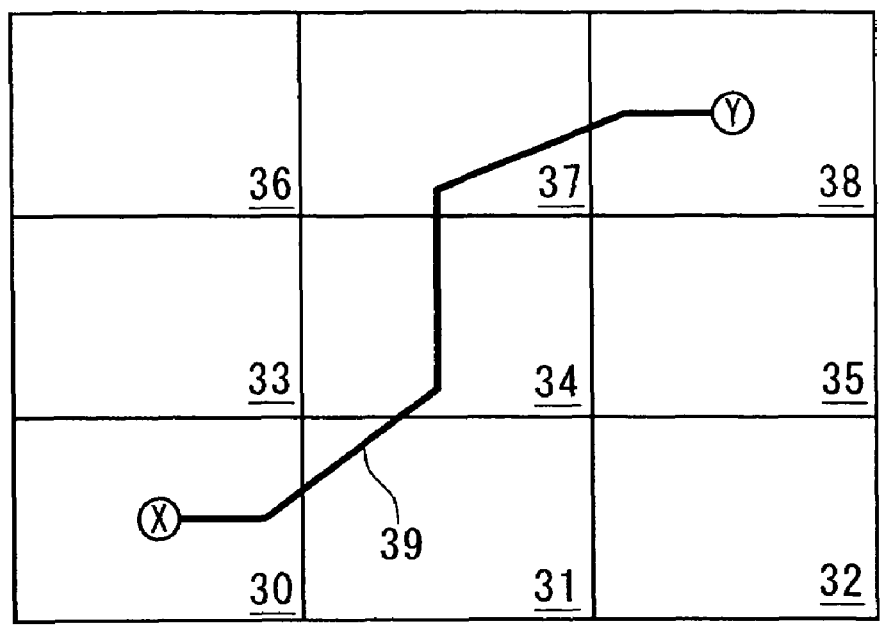
F I G. 5
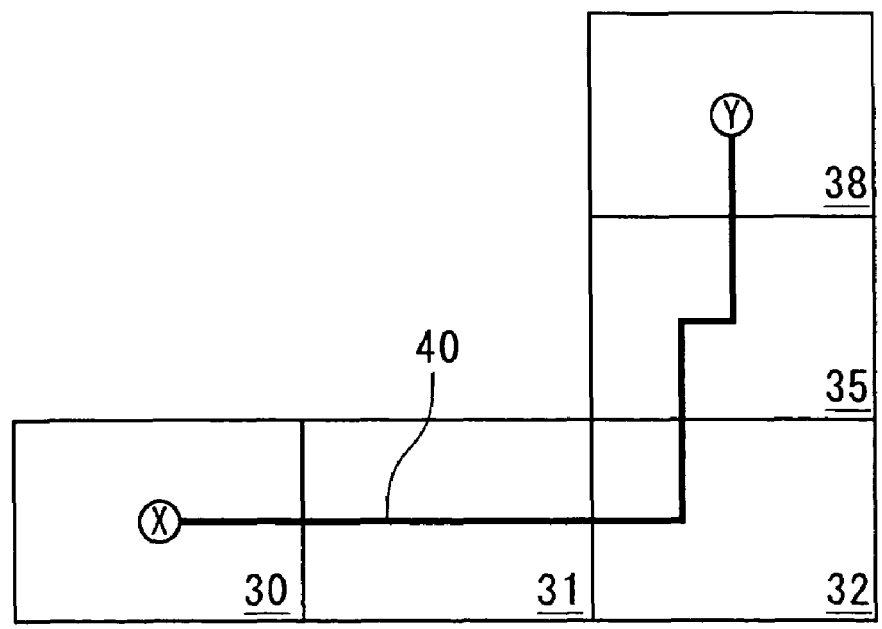

FIG. 11

| | 0 | 1 | 2 | 3 | 4 | 5 |
|---|---|---|---|---|---|---|
| A | TYPE CONDITION A | NO CONDITION | SPORTS | LEISURE | SALES | PACHINKO | EVENTS |
| B | TYPE CONDITION B | NO CONDITION | MARKETS | GAS STATIONS | SIGHTSEEING SPOTS | RESTAURANTS | |
| C | LOCATION CONDITION | NO CONDITION | WITHIN PREFECTURE | AROUND CURRENT LOCATION | AROUND DESTINATION LOCATION | | |
| D | DATE-TIME CONDITION | NO CONDITION | VALID TIME | VALID DAY OF WEEK | INVALID DAY OF WEEK | | |

COMBINATION OF CONDITIONS: (A or B) and C and D

EXAMPLE: N:Japanese Restaurant So-and-So/B4/C:13512, 03524/D1:1100, 2000/D3:3
(the name of the target of which the information is searched for is Japanese Restaurant So-and-So / its type condition B is restaurants / its location is 135 degrees 12 seconds east longitude and 35 degrees 24 seconds north latitude / it is open from 11:00 to 20:00 / it is closed on Wednesdays)

NAVIGATION APPARATUS AND SERVER APPARATUS

CROSS-REFERENCE TO RELATED APPLICATION

This application is a National Stage entry of International Application Number PCT/JP03/07582, filed Jun. 13, 2003. The disclosure of the prior application is hereby incorporated herein in its entirety by reference.

TECHNICAL FIELD

The present invention relates to a navigation apparatus that acquires map information through communication, and also relates to a server apparatus that transmits map information to such a navigation apparatus.

BACKGROUND ART

There are conventionally known route guiding systems that guide people along a route by providing them with map information and other information. For example, navigation methods that rely on mobile communication involving a mobile device, incorporating a global positioning system receiver, and a control station, incorporating a database of map information and other information, work in the following manner. The mobile device transmits to the control station location information and destination information, based on which the control station then retrieves from the database a map around the current location and a route to the destination location. The thus retrieved route information is transmitted back to the mobile device and is displayed on the display section thereof. This permits route guiding to be performed with enhanced accuracy, permits the user to acquire the information they need whenever they need it, and permits the user to be provided with various kinds of information that they may need other than map information (see, for example, Japanese Patent Application Laid-Open No. 2000-213952).

Some conventional navigation systems relying on communication involve a route guiding device, built as a car-mounted or hand-held unit and functioning as a terminal station, and a route information providing device, built as an information center and functioning as a base station, and these navigation systems work as follows. Between the route guiding device and the route information providing device, data such as location information and route guiding information is exchanged through communication so that the route guiding device is fed with information about a route to the destination location. In this way, route guiding is achieved. Here, of the retrieved route, not all but only part that the route guiding device has not yet traveled is selectively exchanged (see, for example, Japanese Patent Application Laid-Open No. 2000-18955).

However, the method disclosed in Japanese Patent Application Laid-Open No. 2000-213952 mentioned above has the following disadvantages. It is all the map information related to the retrieved route that the control station transmits to the mobile device. Thus, a large quantity of data needs to be transmitted through a lengthy communication session, resulting in increased communication costs and long processing time. In particular, in cases where the distance from the current location to the destination location is long, the increases in communication time and communication costs are too large to ignore. Moreover, the lengthy communication session tends to invite heavy communication traffic, leading to trouble such as garbled or aborted communication.

On the other hand, communication-dependent navigation systems like the one disclosed in Japanese Patent Application Laid-Open No. 2000-18955 mentioned above have the following disadvantages. The user often remembers, as known routes, routes that they have ever traveled, and therefore they are unlikely to have much difficulty to reach a destination if provided with only the map information related to the part of the route thereto that they have never traveled before, even if they are not provided with the map information related to the known part thereof. With this system, however, even when the user seeks route guiding but do not actually head for the destination, the retrieved route will be, when the same route is retrieved next time, treated as a known route. Thus, the user cannot acquire the related map information. This can be prevented by notifying the route information providing device of the routes that have actually been traveled. This, however, requires that the information related to the ever traveled routes be transmitted to the route information providing device, resulting in extra communication costs.

Incidentally, some car-mounted navigation apparatuses have guide information related to sightseeing spots, gas stations, and the like stored on a recording medium such as a DVD. For the propose of complementing such guide information in terms of quantity and updatedness, it has been proposed to download additional and updated guide information through communication (see, for example, Japanese Patent Application Laid-Open No. H11-266329). It has also been proposed to add advertisements to such guide information. It has further been proposed to show such guide information on a small screen such as those on cellular phones and PDAs (personal digital assistants). These proposals, however, greatly increase the quantity of guide information handled, now containing advertisements, and thus make it uncomfortable for the user to view the desired guide information, particularly when it is shown on a small display screen.

DISCLOSURE OF THE INVENTION

In view of the conventionally experienced inconveniences described above, it is an object of the present invention to provide a navigation apparatus that operates with reduced communication time and reduced communication costs. It is another object of the present invention to provide a navigation apparatus that permits the user to easily reach the desired items of information among a large quantity of guide information. It is still another object of the present invention to provide a server apparatus that transmits information to such navigation apparatuses.

To achieve the above objects, according to the present invention, a navigation apparatus achieves route guiding by acquiring from a server apparatus map information from a start location to the destination location.

Here, the acquired map information is, for example, a map consisting of unit areas that covers a rectangular area of which two diagonal vertices coincide with the start and destination locations, or a map consisting of unit areas that covers an area including and neighboring a retrieved route. Acquiring only map information that is not stored in the navigation apparatus helps eliminate unnecessary information acquisition. With respect to map information that is stored in the navigation apparatus, if a version thereof having a later creation date-time is found in the server apparatus, it is preferable to acquire this version to update the older stored in the navigation apparatus. This benefits the user.

A search for a route from the start location to the destination location may be performed on the navigation apparatus, or may be performed on the server apparatus with the result of the search then transmitted to the navigation apparatus.

The user may be offered additional services in the form of displays of advertisements and service information related to what is available along and near the retrieved route. Here, to restrict the quantity of information displayed on the navigation apparatus, first the server apparatus transmits search data to the navigation apparatus, and then the user enters search conditions so that these are transmitted back to the server apparatus. In this way, it is possible to acquire only the desired guide information.

The search data includes, for example, date-time restricting data, time restricting data, and location data. This makes it possible to perform detailed searches.

BRIEF DESCRIPTION OF DRAWINGS

FIG. 4 is a diagram showing an example of the map information and planned travel route stored in a navigation apparatus according to the invention.

FIG. 5 is a diagram showing another example of the map information and planned travel route stored in a navigation apparatus according to the invention.

FIG. 11 is a diagram showing the items set as search conditions and the search data in the fourth embodiment.

BEST MODE FOR CARRYING OUT THE INVENTION

Figure 1:
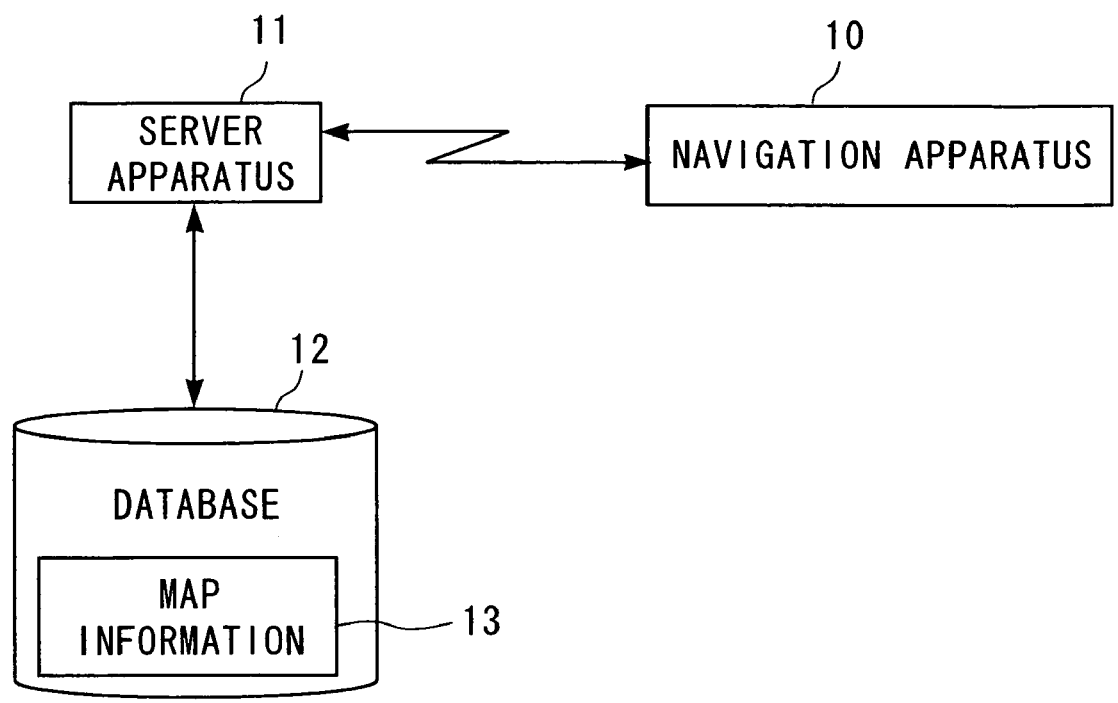
FIG. 1 is a block diagram showing the configuration of a communication system according to the invention.

Hereinafter, embodiments of the present invention will be described with reference to the drawings. FIG. I is a block diagram showing the configuration of a communication system. Reference numeral 10 represents a navigation apparatus, reference numeral 11 represents a server apparatus that communicates with the navigation apparatus 10, and reference numeral 12 represents a database that is connected to the server apparatus 1. The database 12 contains map information 13. The database 12 may be provided within the server apparatus 11.

On receiving a request from the navigation apparatus 10, the server apparatus 11 reads out map information 13 from the database 12 and transmits it to the navigation apparatus 10.

The communication between the navigation apparatus 10 and the server apparatus 11 may be achieved in any manner so long as it is achieved wirelessly. For example, in a case where their communication is conducted over the Internet, it is possible to use a telephone network for car phones, cellular phones, or the like.

Figure 2:
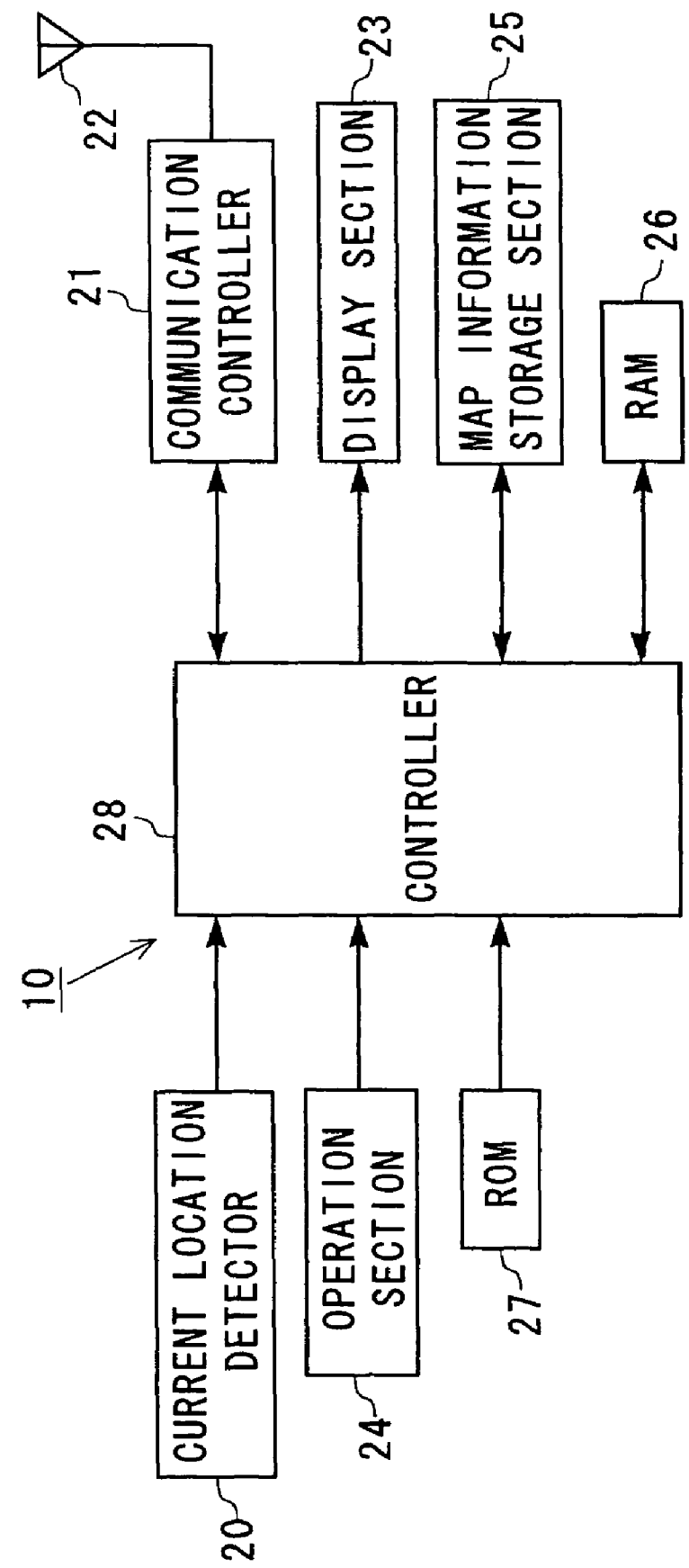
FIG. 2 is a block diagram showing the configuration of the navigation apparatus of a first and a second embodiment of the invention.

FIG. 2 is a block diagram showing the configuration of the navigation apparatus 10. Reference numeral 20 represents a current location detector that obtains information about the current location, travel direction, speed, altitude, and the like by using a GPS receiver, a speed sensor, a gyro, and the like. Reference numeral 21 represents a communication controller that controls the communication with the server apparatus 11. Reference numeral 22 represents an antenna that is connected to the communication controller 21 and that is used to conduct wireless communication.

Reference numeral 23 represents a display section composed of a liquid crystal display or the like for displaying map information and the current location. Reference numeral 24 is an operation section through which the user enters data as for setting the destination location. Reference numeral 25 represents a map information storage section in which are stored map information along with the creation date-time thereof that the map information includes as basic information. It should be noted that the date-time of map information is not always the date-time at which it was created, but also the date-time at which it was updated as when a now road was constructed.

Reference numeral 26 represents a RAM in which the destination location, planned travel route, and the like are temporarily stored. Reference numeral 27 represents a ROM in which the programs needed for the navigation apparatus 10 to operate are stored. Reference numeral 28 represents a controller composed of a microcomputer or the like that controls the navigation apparatus 10 according to the programs stored in the ROM 27. The map information storage section 26 is realized with a storage medium such as a DRAM.

Hereinafter, embodiments of the communication system described above will be described.

First Embodiment

Figure 3:
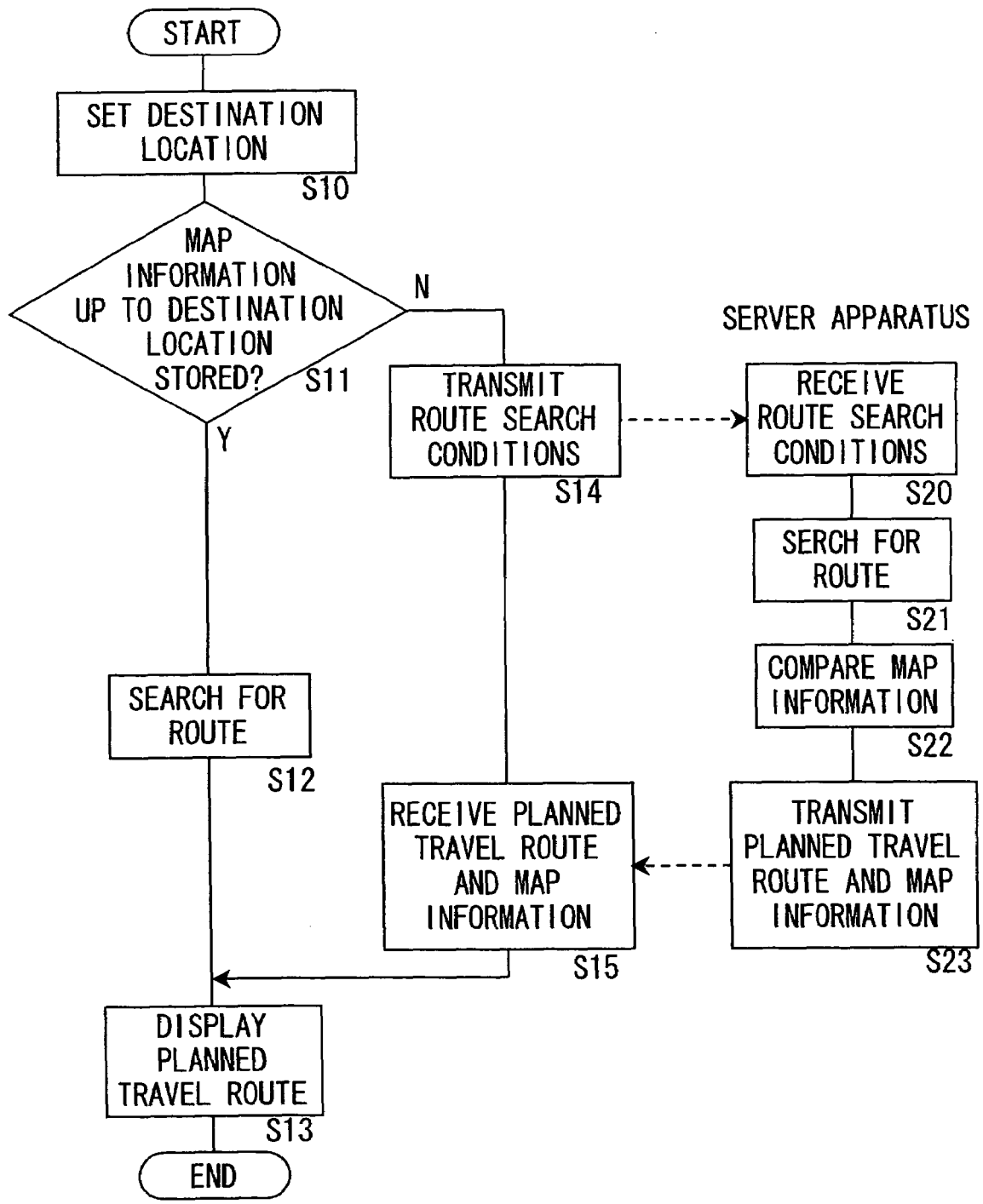
FIG. 3 is a flow chart showing the operation of the navigation apparatus and the server apparatus in the first embodiment.

The operation performed by the communication system to perform route guiding in a first embodiment of the invention will be described. FIG. 3 is a flow chart showing the operation of the navigation apparatus 10 and the server apparatus 11. First, the user, by operating the operation section 24 of the navigation apparatus 10, enters the destination location, and presses a route search execute key (not illustrated). In response, in step S10, the navigation apparatus 10 stores the destination location in the map information storage section 25, and then, in step S11, based on the location information of the current and destination locations and the map information stored in the map information storage section 25, the map information storage section 25 checks whether or not continuous map information from the current location to the destination location is stored.

The destination location can be entered, for example, by specifying an address or telephone number, or by pointing on the displayed map. When the user chooses to point on the map, it may occur that the map information storage section 25 does not have map information that covers the desired destination location. In this case, the map information around the destination location can be acquired from the server apparatus 11.

If, in step S11, it is found that continuous map information from the current location to the destination location is stored in the map information storage section 25, then, in step S12, the controller 28 performs a route search by using the map information stored in the map information storage section 25. On completion of the route search, in step S13, the current location and planned travel route are superimposed on the map information displayed on the display section 23. Thereafter, the screen is scrolled as the current location moves, and route guiding is continued until the destination location is reached.

Here, it is assumed that, when the route guiding is performed, the navigation apparatus 10 has map information around the current location previously stored in the map information storage section 25. The map information may be either that which has been stored since the navigation apparatus 10 was used last time or that which is obtained by automatically receiving map information around the current location (for example, within the 5 km radius area of the current location) when the navigation apparatus 10 is turned on.

On the other hand, if, in step S11, it is found that continuous map information from the current location to the destination location is not stored in the map information storage section 25, that is, if the map information stored there is found to be discontinuous even only partly, then, in step S14, the conditions for a route search, including the location information of the current and destination locations and the area covered by the map information stored in the map information storage section 25, are transmitted to the server apparatus 11.

On completion of step S14, in step S20, the server apparatus 11 receives the conditions for a route search from the navigation apparatus 10, and then, in step S21, the server apparatus 11 accesses the database 12 and performs a route search from the current location to the destination location.

Next, in step S22, the map information along the calculated travel route is compared with the area of the map information received from the navigation apparatus 10, and, from the former, the part that is not stored in the navigation apparatus 10 is extracted. Then, in step S23, the planned travel route calculated in step S21 and the map information extracted in step S22 are transmitted to the navigation apparatus 10.

On completion of step S23, in step S15, the navigation apparatus 10 receives the planned travel route and map information from the server apparatus 11, and stores them in the map information storage section 25. Then, in step S13, by the use of the planned travel route and map information thus obtained, route guiding is performed.

As described above, if, in the course of route guiding, continuous map information from the current location to the destination location is stored in the navigation apparatus 10, a route search is performed within the navigation apparatus 10. This makes it possible to perform route guiding without conducting communication, and thus eliminates the need to worry about the communication time and communication costs. On the other hand, if continuous map information from the current location to the destination location is not stored in the navigation apparatus 10, what needs to be acquired from the server apparatus 11 is only the planned travel route and the part of the map information that is not stored in the map information storage section 25. This helps reduce the communication time and communication costs.

For example, in a case where at least map information 30 to 38 as shown in FIG. 4 is stored in the map information storage section 25, when a current location X and a destination location Y are set and a route search is requested, since continuous map information from the current location X to the destination location Y is stored in the map information storage section 25, the route search is performed within the navigation apparatus 10, and a planned travel route 39 as shown in FIG. 4 is calculated. In the figure, the individual blocks 30 to 38 of the map information represent units of map information, and no information other than that related to the planned travel route is shown.

For example, in a case where map information 30 to 32, 35, and 38 as shown in FIG. 5 is stored in the map information storage section 25, when a current location X and a destination location Y are set and a route search is requested, since continuous map information from the current location X to the destination location Y is stored in the map information storage section 25, the route search is performed within the navigation apparatus 10, and a planned travel route 40 as shown in FIG. 5 is calculated. In this way, although FIG. 5 lacks the map information 34 and 37 shown in FIG. 4, it still has continuous map information from the current location X to the destination location Y, and thus the route search is performed by the use of that map information. This results in a planned travel route 40 different from the planned travel route 39 in FIG. 4.

Figure 6:
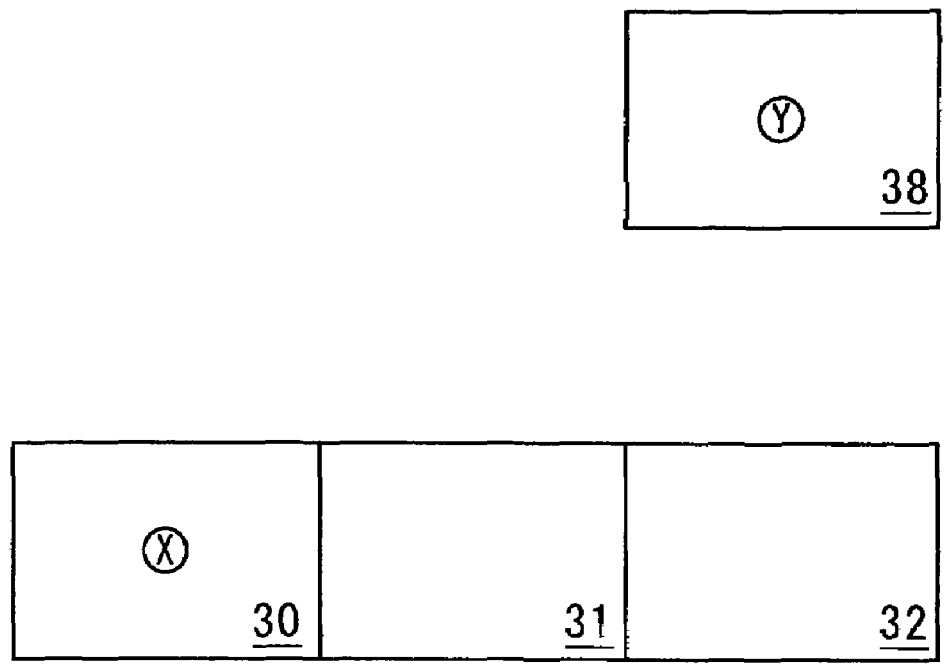
FIG. 6 is a diagram showing an example of the map information, current location, and destination location stored in a navigation apparatus according to the invention.
Figure 7:
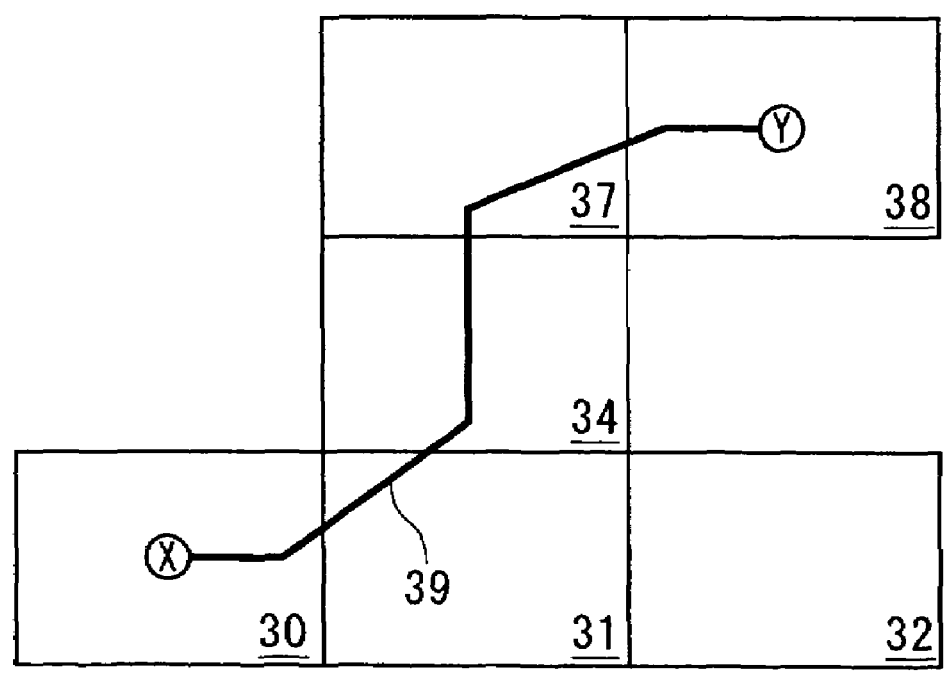
FIG. 7 is a diagram showing the acquired map information and planned travel route superimposed on FIG. 6.

For example, in a case where map information 30 to 32 and 38 as shown in FIG. 6 is stored in the map information storage section 25, when a current location X and a destination location Y are set and a route search is requested, since continuous map information from the current location X to the destination location Y is not stored in the map information storage section 25, the navigation apparatus 10 transmits route search conditions to the server apparatus 11. The server apparatus 11 then performs a route search, calculates a planned travel route 39 as shown in FIG. 7, extracts map information 34 and 37 from the database 12, and transmits them to the navigation apparatus 10. In this way, the planned travel routes 39 in FIGS. 7 and 4 are the same, but are different from the planned travel route 40 in FIG. 5. The planned travel route 39 is shorter than the planned travel route 40, and can thus be said to be the optimum route.

That is, in a case where, as in FIG. 4, all the neighborhood map up to the destination location is stored in the map information storage section 25, the optimum route can be retrieved within the navigation apparatus 10. By contrast, in a case where, as in FIG. 5, only particular parts of the map information up to the destination location are stored in the map information storage section 25, a route search can be performed within the navigation apparatus 10, but the retrieved route is not always the optimum route. Accordingly, to retrieve the optimum route, it is necessary to perform a route search in the server apparatus 11 at extra costs and with longer communication time.

Second Embodiment

As a second embodiment of the invention, a description will be given below of a navigation apparatus 10 that permits the choice of whether to perform a route search on the navigation apparatus 10 or on the server apparatus 11.

Figure 8:
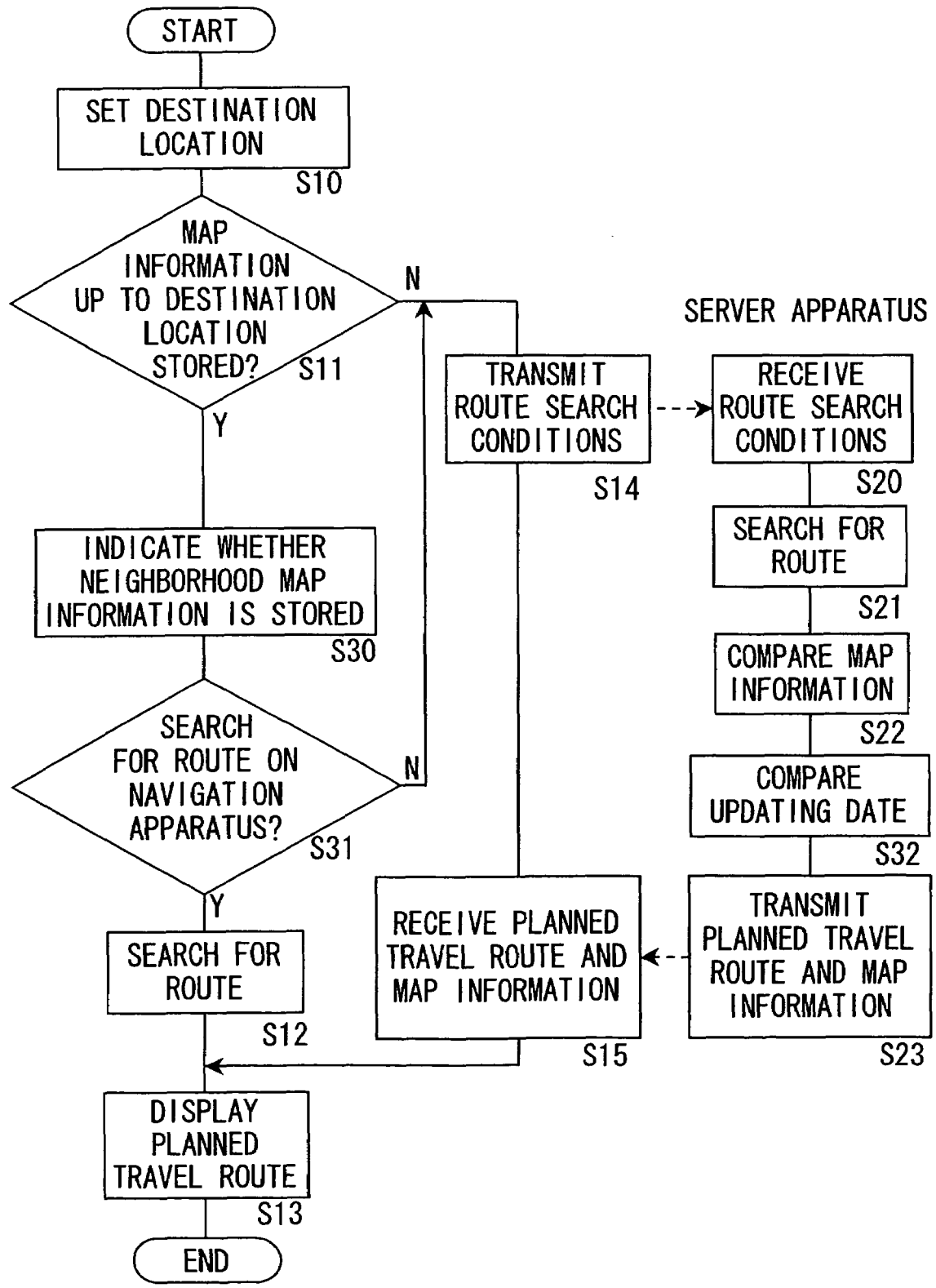
FIG. 8 is a flow chart showing the operation of the navigation apparatus and the server apparatus in the second embodiment.

FIG. 8 is a flow chart showing the operation of the navigation apparatus 10 and the server apparatus 11 in the second embodiment. Here, such steps as find their counterparts in FIG. 3 are identified with the same reference numerals, and their detailed explanations will not be repeated.

If, in step S11, it is found that continuous map information from the current location to the destination location is stored in the map information storage section 25, then, in step S30, whether or not it includes neighborhood map information is indicated. Specifically, a quadrilateral (for example, rectangular) map of which two diagonal vertices coincide with the current and destination locations is displayed, with those parts thereof that are not stored in the map information storage section 25 displayed in black, white, or the like so as to be recognizable as such. The thus displayed image is, for example, like the one shown in FIG. 5 with the planned travel route 40 deleted.

Based on the thus displayed indication of whether or not particular parts of the map are stored, the user chooses whether to perform the route search on the navigation apparatus 10 or on the server apparatus 11, and enters their choice by operating the operation section 24. Here, if the displayed parts of the map is rather few, it is better to perform the route search on the server apparatus 11 to surely obtain the optimum route.

After step S30, in step S31, which choice has been made, whether to perform the route search on the navigation apparatus 10 or on the server apparatus 11, is checked. If, in step S31, it is found that the route search has been chosen to be performed on the navigation apparatus 10, then the flow proceeds to step S12. By contrast, if in step S31, it is found that the route search has been chosen to be performed on the server apparatus 11, then the flow proceeds to step S14.

In a case where the route search is performed on the server apparatus 11, as the flow proceeds through steps S14 to S22 to step S32, the planned travel route calculated in step S21 and the map information extracted in step S22 are transmitted to the navigation apparatus 10.

As described above, even when the map information up to the destination location is stored in the map information storage section 25, by permitting the choice of whether to perform a route search on the navigation apparatus 10 or on the server apparatus 11, it is possible to permit the choice between whether to give priority to reducing the communication time and communication costs or to surely obtain the optimum planned travel route.

In the second embodiment, a route search is described as being performed from the current location to the destination location. Instead, it is also possible to set a start location and a destination location through a similar flow of operations. This makes it possible to perform a route search starting at the desired start location.

Step S30 is not absolutely necessary; that is, the user may be requested to make a choice without a displayed indication. Alternatively, it is also possible to omit step S30 and let the controller 28 automatically make a choice based on the amount of map information or the like in step S31. A choice can be made automatically, for example, by letting the server apparatus automatically perform a route search if any part of the map information containing a quadrilateral (for example, rectangular) map of which two diagonal vertices coincide with the starting (or current) location and the destination location is missing.

There may be cases where step S21 is not necessary. For example, in a case where the server apparatus 11 acquires the map information of a quadrilateral area of which two diagonal vertices coincide with the starting and destination locations, there is no need to perform a route search on the server apparatus; instead, after the acquisition of the map information, a route search is performed on the navigation apparatus 10.

If, in step S11, it is found that the map information up to the destination location is stored, after a route search is performed on the navigation apparatus 10, the map information of unit areas neighboring the planned travel route may be acquired from the server apparatus so that the navigation apparatus 10 then performs a route search once again before starting route guiding. Even if a route that is not the shortest, like the planned travel route 40 in FIG. 5, has been calculated, by acquiring neighborhood map information and then performing a route search once again, it is possible to calculate the shortest route like the planned travel route 39 in FIG. 4.

Third Embodiment

Figure 9:
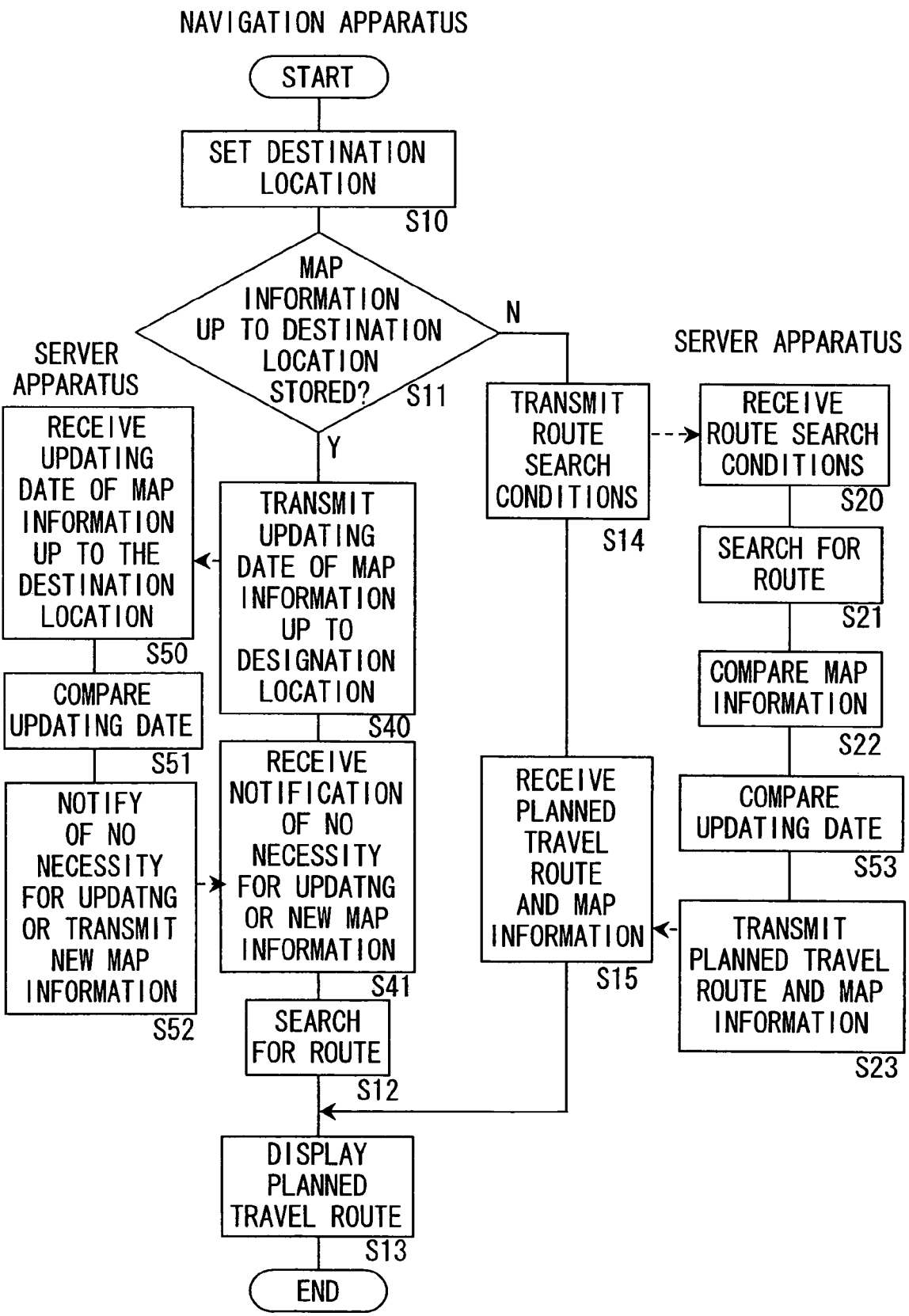
FIG. 9 is a flow chart showing the operation of the navigation apparatus and the server apparatus in a third embodiment of the invention.

Now, the operation performed by the communication system to perform route guiding in a third embodiment of the invention will be described. FIG. 9 is a flow chart showing the operation of the navigation apparatus 10 and the server apparatus 11. Here, such steps as find their counterparts in FIG. 3 are identified with the same reference numerals, and their detailed explanations will not be repeated.

If, in step S11, it is found that continuous map information from the current location to the destination location is stored in the map information storage section 25, then, in step S40, the controller 28 transmits to the server apparatus 11 information about the creation date-time of the map information from the current location to the destination location that is stored in the map information storage section 25.

On completion of step S40, in step S50, the server apparatus 11 receives the information, transmitted from the navigation apparatus 10, about the creation date-time of the map information stored therein. Then, in step S51, the server apparatus 11 accesses the database 12 to compare the creation date-time. Then, in step S52, if the creation date-time of the map information stored in the navigation apparatus 10 as received therefrom is identical with that of the map information 13 stored in the database 12, the server apparatus transmits to the navigation apparatus 10 information indicating that no updating is needed; if the former is older than the latter, the server apparatus 11 reads out new map information from the database 12 and transmits it to the navigation apparatus 10.

On completion of step S52, in step 41, according to instructions from the controller 28, the navigation apparatus 10 receives the new map information from the server apparatus 11, and stores it in the map information storage section 25. Here, it is preferable that the old map information be overwritten with the new map information. Here, if the navigation apparatus 10 receives from the server apparatus 11 information indicating that no updating of the map information is necessary, it does not receive any map information.

On completion of step S41, in step S12, the controller 28 performs a route search by the use of the map information stored in the map information storage section 25. On completion of the route search, then, in step S13, the current location and planned travel route are superimposed on the map information displayed on the display section 23. Thereafter, the screen is scrolled as the current location moves, and route guiding is continued until the destination location is reached.

On the other hand, if, in step S11, it is found that continuous map information from the current location to the destination location is not stored in the map information storage section 25, that is, if the map information stored there is found to be discontinuous even only partly, then, in step S14, the conditions for a route search, including the location information of the current and destination locations and the area covered by the map information stored in the map information storage section 25, are transmitted to the server apparatus 11.

On completion of step S14, in step S20, the server apparatus 11 receives the conditions for a route search from the navigation apparatus 10, and then, in step S21, the server apparatus 11 accesses the database 12 and performs a route search from the current location to the destination location.

Next, in step S22, the map information along the calculated travel route is compared with the area of the map information received from the navigation apparatus 10, and, from the former, the part that is not stored in the navigation apparatus 10 is extracted. Then, in step S53, whatever part of the map information along the planned travel route stored in the map information storage section 25 has a later creation date-time than the map information stored in the map information storage section 25 is read out.

Then, in step S23, the planned travel route calculated in step S21 and the map information extracted in steps S22 and S53 are transmitted to the navigation apparatus 10.

On completion of step S23, in step S15, according to instructions from the controller 28, the navigation apparatus 10 acquires from the server apparatus 11 the planned travel route and map information, and stores them in the map information storage section 25. Thereafter, in step S13, by the use of the planned travel route and map information thus obtained, route guiding is performed.

As described above, if, in the course of route guiding, continuous map information from the current location to the destination location is stored in the navigation apparatus 10, the navigation apparatus 10 transmits to the server apparatus 11 the creation date-time of the map information stored in the map information storage section 25. Thus, the navigation apparatus 10 acquires map information only when an updated version thereof is available. In this way, it is possible to perform a route search within the navigation apparatus 10 by always using the most recent map information, while reducing the communication time and communication costs. On the other hand, if continuous map information from the current location to the destination location is not stored in the navigation apparatus 10, what needs to be acquired from the server apparatus 11 is only the planned travel route, the part of the map information that is not stored in the map information storage section 25, and the map information having a later creation date-time. This helps always use the most recent map information, and also helps reduce the communication time and communication costs.

For example, in a case where at least map information 30 to 38 as shown in FIG. 4 is stored in the map information storage section 25, when a current location X and a destination location Y are set and a route search is requested, since continuous map information from the current location X to the destination location Y is stored in the map information storage section 25, the navigation apparatus 10 transmits to the server apparatus 11 information about the creation date-time of the map information 30 to 38. The server apparatus 11 then compares the creation date-time of the map information 30 to 38 with that of the map information 13 stored in the database 12, and transmits to the navigation apparatus 10 only those parts of the map information that have a different creation date-time. Thus, the navigation apparatus 10 acquires only updated map information from the server apparatus 11 and stores it in the map information storage section 25. Then, the route search is performed within the navigation apparatus 10, and a planned travel route 39 as shown in FIG. 4 is calculated.

For example, in a case where map information 30 to 32, 35, and 38 as shown in FIG. 5 is stored in the map information storage section 25, when a current location X and a destination location Y are set and a route search is requested, since continuous map information from the current location X to the destination location Y is stored in the map information storage section 25, the navigation apparatus 10 transmits to the server apparatus 11 the creation date-time of the map information 30 to 32, 35, and 38, and the operations that are performed thereafter are the same as those described above. Here, by the use of the map information 30 to 32, 35, and 38, the route search is performed within the navigation apparatus 10, and a planned travel route 40 as shown in FIG. 5 is calculated. In this way, although FIG. 5 lacks the map information 34 and 37 shown in FIG. 4, it still has continuous map information from the current location X to the destination location Y, and thus the route search is performed by the use of that map information. This results in a planned travel route 40 different from the planned travel route 39 in FIG. 4.

For example, in a case where map information 30 to 32 and 38 as shown in FIG. 6 is stored in the map information storage section 25, when a current location X and a destination location Y are set and a route search is requested, since continuous map information from the current location X to the destination location Y is not stored in the map information storage section 25, the navigation apparatus 10 transmits route search conditions to the server apparatus 11. The server apparatus 11 then performs a route search, calculates a planned travel route 39 as shown in FIG. 7, extracts map information 34 and 37 from the database 12, and also extracts whatever part of the map information has a later creation date-time than its counterpart stored in the map information storage section 25, and transmits them to the navigation apparatus 10. In this way, the planned travel routes 39 in FIGS. 7 and 4 are the same, but are different from the planned travel route 40 in FIG. 5. The planned travel route 39 is shorter than the planned travel route 40, and can thus be said to be the optimum route.

That is, in a case where, as in FIG. 4, all the neighborhood map up to the destination location is stored in the map information storage section 25, the optimum route can be retrieved within the navigation apparatus 10. By contrast, in a case where, as in FIG. 5, only particular parts of the map information up to the destination location are stored in the map information storage section 25, a route search can be performed within the navigation apparatus 10, but the retrieved route is not always the optimum route. Accordingly, to retrieve the optimum route, it is necessary to perform a route search in the server apparatus 11 at extra costs and with longer communication time.

Accordingly, it is preferable that the user be permitted, in step S11, to make the choice of whether to perform a route search on the navigation apparatus 10 or on the server apparatus 11 even when the map information up to the destination location is stored in the map information storage section 25.

In the embodiment described above, the comparison of the updating date is performed by the server apparatus. Instead, it is also possible to make the server apparatus transmit the updating date before transmitting map information and make the navigation apparatus compare the updating date to decide whether or not to receive the map data.

In the present invention, prior to a route search, the type of road to be searched for may be permitted to be specified. Advisably, this is performed, for example, after the setting of the destination location. Here, roads can be classified into different types, for example, according to the conditions under which the user desires to use them, such as whether or not to use express ways, whether or not to use toll roads, whether or not to use national roads with priority, etc. This makes it possible to search for a planned travel route involving roads that meet the conditions under which the user desires to travel, as when they do not like to pay any toll, when they want to travel only wide roads, etc.

With this configuration, if continuous map information involving the selected type of road and covering from the start location to the destination location is not stored in the navigation apparatus, by acquiring from the server apparatus only the planned travel route and the map information that is not stored in the map information storage section, it is possible to perform a route search involving the type of road desired by the user, and to reduce the communication time and communication costs.

In the present invention, when a route search is performed, a planned travel route can be calculated based on the degree of traffic congestion and the distance to travel. In this case, traffic information such as that provided by the VICS (Vehicle Information and Communication System) can be used.

Moreover, in the present invention, when the capacity of the map information storage section 25 becomes scarce, simply unnecessary map information is deleted and new map information is acquired. Here, unnecessary map information includes that having an old acquisition or creation date-time, or that which is used only infrequently.

Furthermore, in the present invention, when the user drives without performing a route search but with the map information around the current location displayed, if the map information that needs to be displayed next as the screen is scrolled is not stored in the map information storage section 25, advisably, the necessary map information is acquired from the server apparatus 11.

Fourth Embodiment

Figure 10:
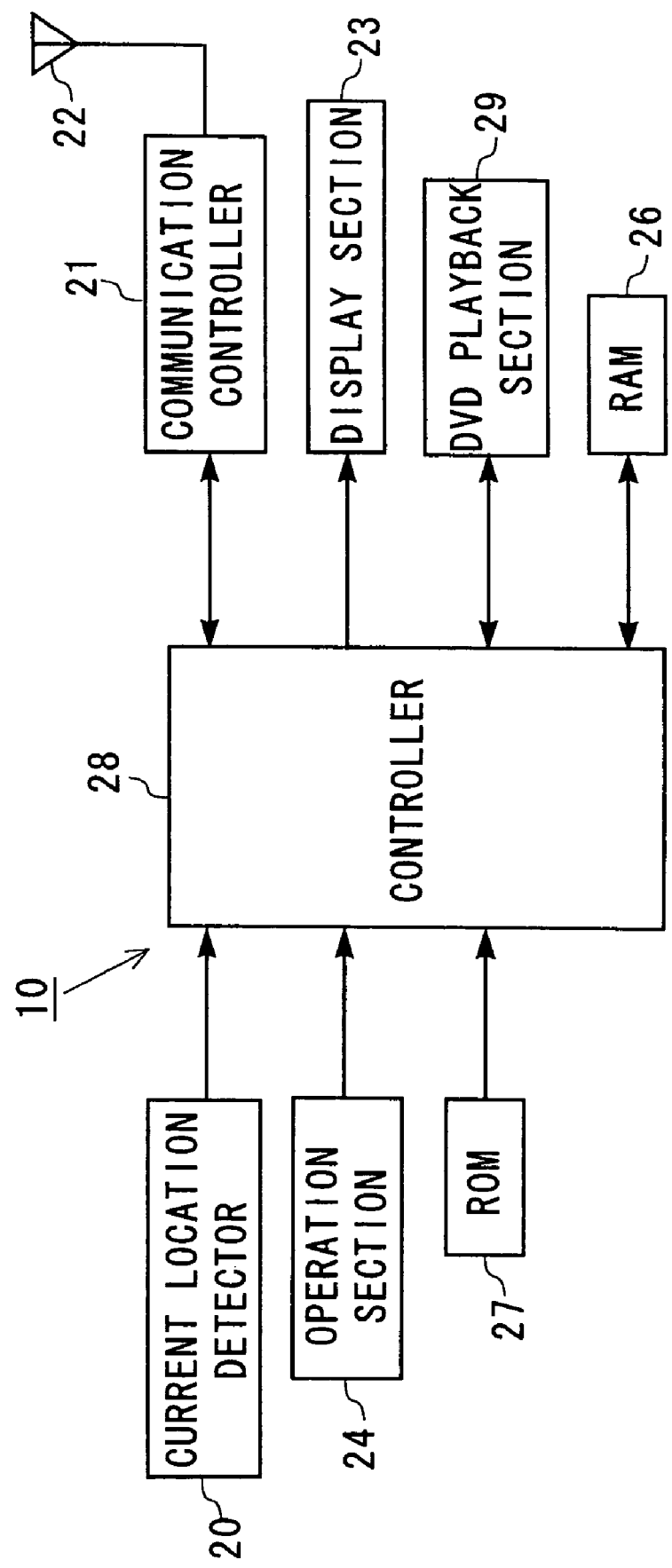
FIG. 10 is a block diagram showing the configuration of the navigation apparatus of a fourth embodiment of the invention.

A fourth embodiment of the invention deals with a navigation apparatus that reads out map information and neighborhood information from a recording medium having a small capacity. FIG. 10 is a block diagram showing the configuration of the navigation apparatus 20 of the fourth embodiment. The difference from FIG. 2 is that, in place of the map information storage section 25, there is provided a DVD playback section 29. This permits map information to be read out from a DVD having map information on different scales written thereto.

With this configuration, the navigation apparatus 20 acquires items of guide information, such as service information and advertisements, through the communication controller 21 (receiving means) from the server apparatus 11, and stores them in the RAM 26 Each item of guide information contains guide data, plus search data, of which an example is shown in FIG. 11. The guide data consists of the names and locations of goods and services providers, plus the contents data indicating the goods and services they provide (for example, for restaurants, the menus they offer, and, for gas stations, the prices at which they sell gasoline).

Now, the example of the search data shown in FIG. 11 will be described. There are a large number of items of guide information such as service information and advertisements, and therefore receiving all of them causes inconveniences in terms of the communication time, communication costs, display performance, and searching performance. To avoid these inconveniences, according to the present invention, prior to downloading any contents data, only the contents data that fulfils the conditions set by the user is received. An example of how such conditions are set is the table shown in FIG. 11.

Condition group A includes type conditions A, with number 0 assigned to "no condition", number 1 to "sports", number 2 to "leisure", number 3 to "sales", number 4 to "pachinko", and number 5 to "events". Condition group B includes type conditions B, with number 0 assigned to "no condition", number 1 to "markets", number 2 to "gas stations", number 3 to "sightseeing spots", and number 4 to "restaurants". Condition group C includes location conditions, with number 0 assigned to "no condition", number 1 to "within the prefecture", number 2 to "around the current location", and number 3 to "around the destination location". Condition group D includes date-time conditions, with number 0 assigned to "no condition", number 1 to "valid time", number 2 to "valid date", and number 3 to "invalid day of week".

In each group, the user can select one or more of numbers 1 and greater; if none of these is selected, number 0 assigned to "no condition" is automatically selected, in which case all the contents data classified under that group is downloaded. The relationship between the condition groups A to D is expressed, in logical terms, as follows: (Group A or Group B) and Group C and Group D.

The search data received before contents data is acquired from the server apparatus 11 is, for example as shown in FIG. 11, like this: "N-Japanese Restaurant So-and-So/B4/C; 13512,03524/D1;1100,2000/D3;3". This denotes: the name of the target of which the information is searched for is Japanese Restaurant So-and-So; its type condition B is restaurants; its location is 135 degrees 12 seconds east longitude and 35 degrees 24 seconds north latitude; it is open from 11:00 to 20:00; and it is closed on Wednesdays. That is, different conditions are separated from one another with slashes "/", and condition item numbers are separated from the data they require with semicolons";".

Figure 12:
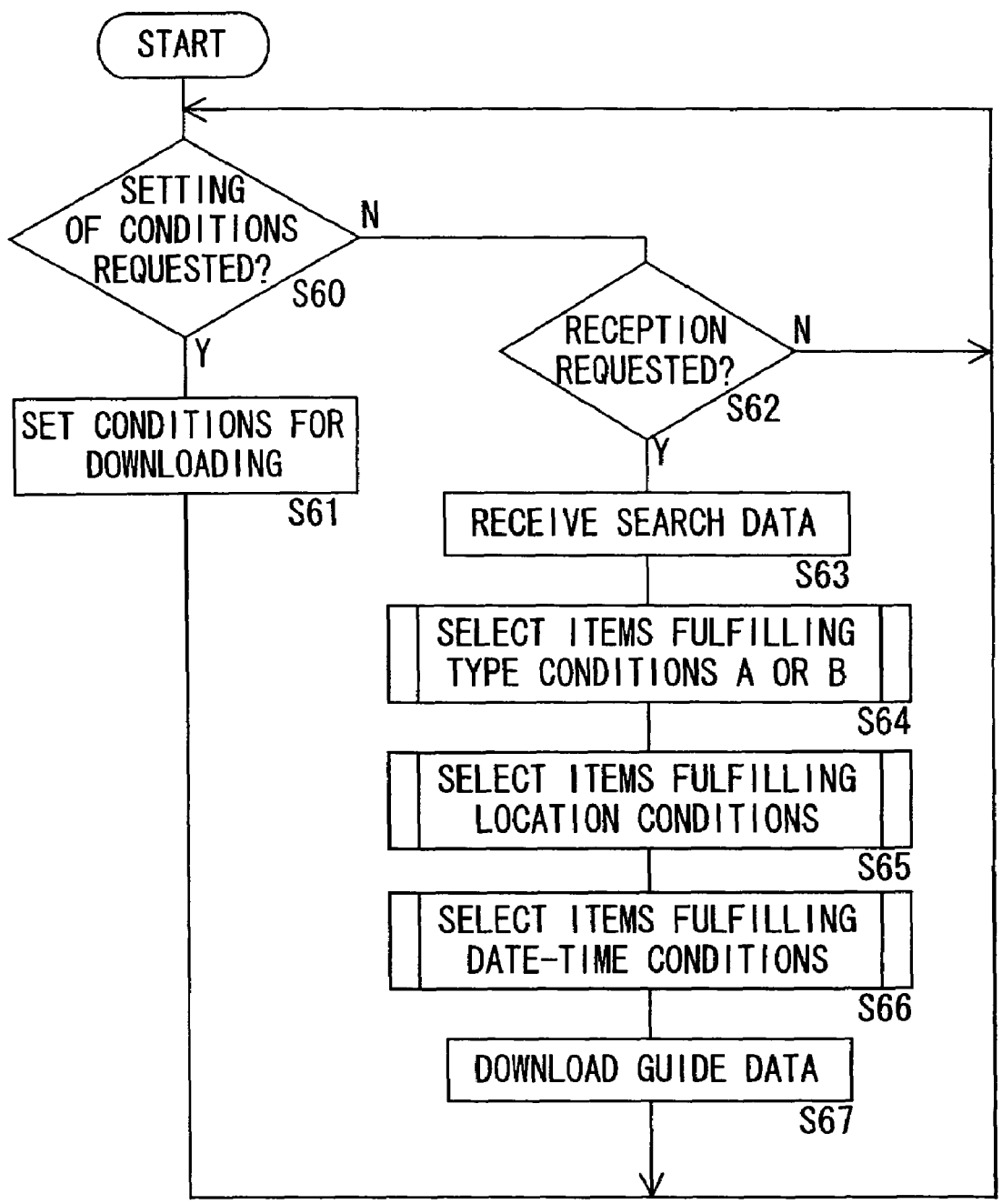
FIG. 12 is a flow chart showing the operation of the navigation apparatus in the fourth embodiment.
Figure 13:
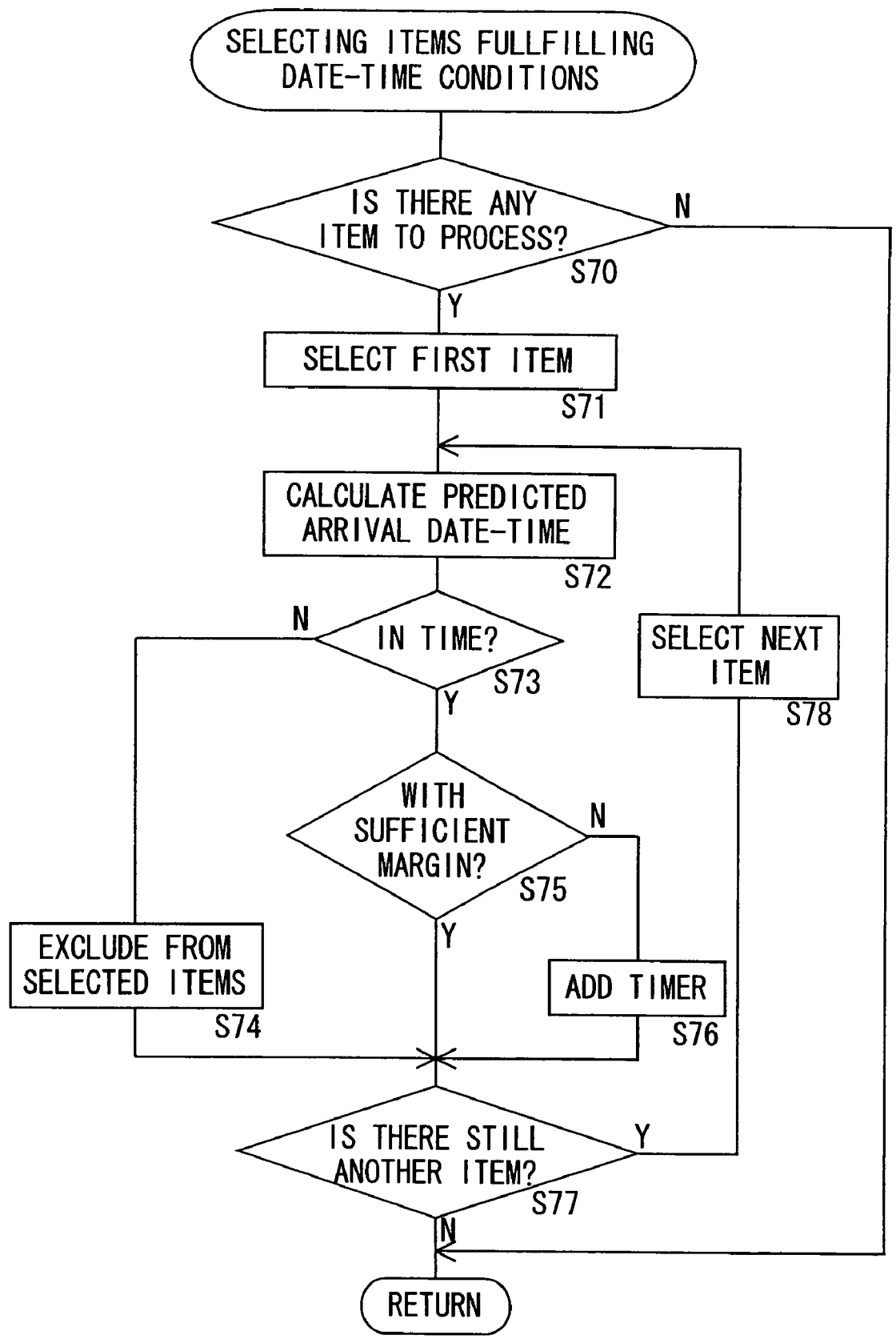
FIG. 13 is a flow chart showing the detailed operation of step S66 shown in FIG. 12.

Next, the operation of this embodiment will be described. FIG. 12 is a flow chart showing the operation of the controller 28 (controlling means), and FIG. 13 is a flow chart showing the detailed operation of step S66 in FIG. 12. When, in step S60, the user sets the conditions shown in FIG. 11 by operating the operation section (inputting means) 24, then, in step S61, the controller 28 stores the set conditions in the RAM 26.

After step S60, when, in step S62, the controller 28 receives a request to receive, then, in step S63, the controller 28 receives search data from the server apparatus 11. Here, a request to receive is given on various occasions; for example, reception may be started when the operation section 24 is operated (for example, to make preparations for departure), every time a predetermined distance has been traveled, every time a predetermined length of time has elapsed, and when a start signal from the server apparatus 11 is received (for example, when a signal for delivering an advertisement is transmitted from the server apparatus 11 as the user approaches a restaurant or convenience store).

Next, in step S64, based on the received search data of one or more items of guide information, those items which fulfill type conditions A or B are selected. This leaves only such items of guide information as fulfill the set types. Next, in step S65, those items which fulfill the location conditions are selected. This leaves only such items of guide information as fulfill the set locations (areas). Next, in step S66, those items which fulfill the date-time conditions are selected.

Now, the operation performed in step S66 will be described in detail with reference to FIG. 13. In step S70, if, after the narrowing performed up to step S65, there still remain items to be processed, then, in step S71, the controller 28 selects the first item of guide information as a target of processing. Next, in step S72, the controller 28 calculates the predicted date-time at which the location of the selected guide information will be reached. Here, the predicted date-time is calculated by simulating a drive from the current location to the location of the selected guide information over the shortest distance. The simulation here is done with consideration given to the types of roads, the number of lanes, the numbers of right and left turns, the numbers of traffic lights and railroad crossings, the traffic information along the route, and the like.

After step S72, if, in step S73, the predicted date-time does not fulfill the set date-time conditions, then, in step S74, this item of guide information is excluded from those items of which the contents data has been selected for downloading. After step S73, in step S75, if the location can be reached amply in time (for example, with a 30 minutes' margin), the flow proceeds to step S77. If, in step S75, the location cannot be reached amply in time, then, in step S76, the controller 28 attaches a timer-accompanied flag to that item of guide information. A timer-accompanied flag causes the remaining time to be displayed when the item of guide information to which it is attached is displayed. For example, the time remaining until a bank is closed is displayed. In this way, all the items of guide information are subjected to selection of those which fulfill the date-time conditions (S77, S78, and S72).

Back in FIG. 12, after step S66, in step S67, only the guide data of the items of guide information that have been narrowed according to the conditions set by the user is acquired, and is stored in the RAM 26. Of the guide information stored in the RAM 26, appropriate items are displayed as necessary (for example, while the user is driving, when they set a route, or when they search for services or advertisements). In addition, for items to which a timer is attached, the remaining time is displayed.

Incidentally, the operation of the navigation apparatus of the fourth embodiment may be executed before or after the first to third embodiments.

As described above, as navigation apparatuses and cellular phones and PDAs incorporating GPS receivers become increasingly widespread, the demand is increasing for service information distributed through communication, and advertisements are also increasing. With the navigation apparatus 20 described above, it is possible to easily select, from among a large number of items of guide information, only those desired by the user. This is effective in terms of the communication time, communication costs, display size, and searching performance.

INDUSTRIAL APPLICABILITY

Navigation apparatuses according to the present invention not only find application in portable and car-mounted use, but can also be incorporated. in cellular phones, PDAs (personal digital assistants), personal computers, and the like.

The invention claimed is:

1. A navigation apparatus comprising a map information storage section for storing map information acquired from a server apparatus,
wherein, if continuous map information from a start location to a destination location is not stored in the map information storage section, the navigation apparatus transmits the start location and the destination location to the server apparatus in order to acquire therefrom map information of unit areas that covers a rectangular area of which two diagonal vertices coincide with the start and destination locations, the navigation apparatus then stores the acquired map information in the map information storage section.

2. The navigation apparatus of claim 1,
wherein the acquired map information only contains map information that is not stored in the map information storage section.

3. The navigation apparatus of claim 1,
wherein the acquired map information contains map information that is not stored in the map information storage section and map information of which a version having an earlier creation date-time is stored in the map information storage section.

4. The navigation apparatus of claim 1,
wherein the navigation apparatus receives search data from the server apparatus and acquires therefrom guide data that fulfills a desired search condition.

5. The navigation apparatus of claim 1,
wherein the navigation apparatus receives date-time restricting data from the server apparatus and acquires therefrom guide data that fulfills a desired date-time condition.

6. The navigation apparatus of claim 1,
wherein the navigation apparatus receives time-restricting data and location data from the server apparatus, then predicts based on the time-restricting data and the location data a time at which a target location of route guiding will be reached, and then acquires from the server apparatus guide data that fulfills the time-restricting data.

7. The navigation apparatus of claim 1,
wherein the navigation apparatus acquires a route retrieved by the server apparatus.

8. The navigation apparatus of claim 1,
wherein a route is searched for by using the map information stored in the map information storage section, including map information acquired from the server apparatus.

9. A navigation apparatus comprising a map information storage section for storing map information acquired from a server apparatus,
wherein continuous map information from a start location to a destination location is stored in the map information storage section, and, if there exists any other continuous combination, the navigation apparatus transmits the start location and the destination location to the server apparatus in order to acquire therefrom map information consisting of unit areas that covers a rectangular area of which two diagonal vertices coincide with the start and destination locations, the navigation apparatus then storing the acquired map information in the map information storage section.

10. The navigation apparatus of claim 9,
wherein the acquired map information only contains map information that is not stored in the map information storage section.

11. The navigation apparatus of claim 9,
wherein the acquired map information contains map information that is not stored in the map information storage section and map information of which a version having an earlier creation date-time is stored in the map information storage section.

12. The navigation apparatus of claim 9,
wherein the navigation apparatus receives search data from the server apparatus and acquires therefrom guide data that fulfills a desired search condition.

13. The navigation apparatus of claim 9,
wherein the navigation apparatus receives date-time restricting data from the server apparatus and acquires therefrom guide data that fulfills a desired date-time condition.

14. The navigation apparatus of claim 9,
wherein the navigation apparatus receives time-restricting data and location data from the server apparatus, then predicts based on the time-restricting data and the location data a time at which a target location of route guiding will be reached, and then acquires from the server apparatus guide data that fulfills the time-restricting data.

15. The navigation apparatus of claim 9,
wherein the navigation apparatus acquires a route retrieved by the server apparatus.

16. The navigation apparatus of claim 9,
wherein a route is searched for by using the map information stored in the map information storage section, including map information acquired from the server apparatus.

17. A navigation apparatus comprising a map information storage section for storing map information acquired from a server apparatus,
wherein, if continuous map information from a start location to a destination location is stored in the map information storage section, a route is searched for, and the navigation apparatus acquires from the server apparatus map information consisting of unit areas that covers an area including and neighboring the retrieved route, the navigation apparatus then storing the acquired map information in the map information storage section.

18. The navigation apparatus of claim 17,
wherein the acquired map information only contains map information that is not stored in the map information storage section.

19. The navigation apparatus of claim 17,
wherein the acquired map information contains map information that is not stored in the map information storage section and map information of which a version having an earlier creation date-time is stored in the map information storage section.

20. The navigation apparatus of claim 17,
wherein the navigation apparatus receives search data from the server apparatus and acquires therefrom guide data that fulfills a desired search condition.

21. The navigation apparatus of claim 17,
wherein the navigation apparatus receives date-time restricting data from the server apparatus and acquires therefrom guide data that fulfills a desired date-time condition.

22. The navigation apparatus of claim 17,
wherein the navigation apparatus receives date-time restricting data from the server apparatus and acquires therefrom guide data that fulfills a desired date-time condition.

23. The navigation apparatus of claim 17,
wherein the navigation apparatus acquires a route retrieved by the server apparatus.

24. The navigation apparatus of claim 17,
wherein a route is searched for by using the map information stored in the map information storage section, including map information acquired from the server apparatus.

25. A server apparatus for transmitting map information to a navigation apparatus,
wherein, when the server apparatus receives from the navigation apparatus a start location and a destination location, the server apparatus transmits to the navigation apparatus map information consisting of unit areas that covers a rectangular area of which two diagonal vertices coincide with the start and destination locations.

* * * * *